R. C. BENNER AND H. F. FRENCH.
DRY CELL.
APPLICATION FILED AUG. 14, 1919.
1,375,202.
Patented Apr. 19, 1921.
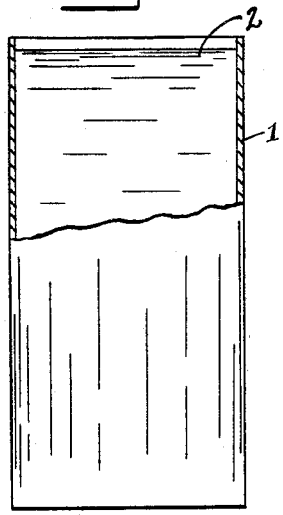
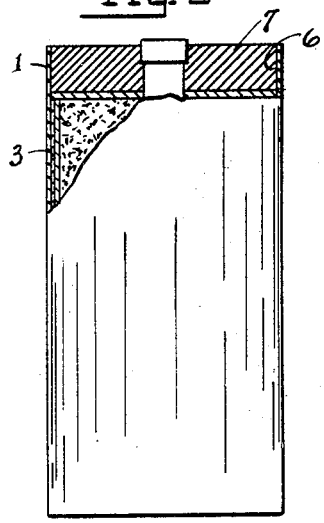
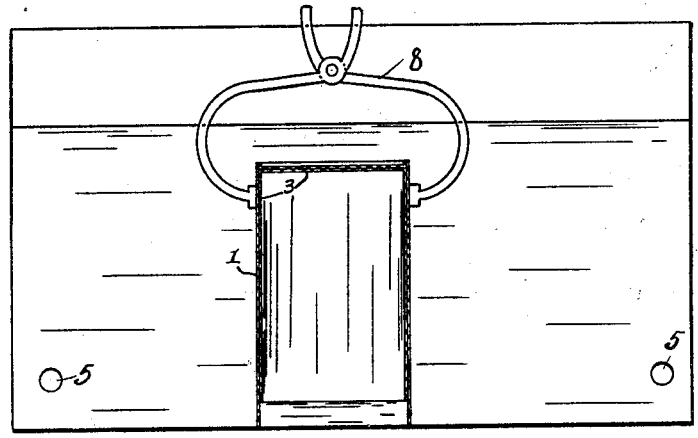
INVENTOR.
H.F. FRENCH
AND R.C. BENNER
BY
ATTORNEY

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

DRY CELL.

1,375,202.　　　Specification of Letters Patent.　　Patented Apr. 19, 1921.

Application filed August 14, 1919. Serial No. 317,580.

*To all whom it may concern:*

Be it known that we, RAYMOND C. BENNER and HARRY F. FRENCH, citizens of the United States, and residents of Fremont, in the county of Sandusky and State of Ohio, have invented a certain new and useful Improvement in Dry Cells, of which the following is a full, clear, and exact description.

This improvement relates to electric batteries, and more particularly to a process of applying coatings to the inside of the zinc can. We have found that a coating of flour or equivalent paste can be applied to dry cells with advantageous results by coating the inside of the can with raw flour paste or equivalent and then cooking it to the zinc in a novel manner. The most satisfactory coating for a dry cell zinc should be thin, tough, smooth and dry, and by this novel method we secure such coatings. Other methods of applying coatings which we have utilized, using raw flour paste, result in a wet, pasty coating, which is too thick if cooked long and too weak if cooked for a sufficiently short time to give a thin coating.

There are various ways that the raw paste could be applied to the zinc before cooking, but by way of example we have illustrated in the drawings a preferable method.

In the drawings:

Figure 1 is a view in partial cross section illustrating the step of applying the raw paste.

Fig. 2 is a diagrammatic view illustrating the step of cooking the paste on the can.

Fig. 3 is a partial section of a finished dry cell showing the assembled relation of the flour coating and other dry cell elements.

Before the paste is applied to the can it is desirable to clean the inside of the can by means of a cleaning solution, such as sulfuric acid and potassium bichromate. The surface of rolled zinc as a rule contains greasy spots to which flour paste does not adhere as well as to clean zinc. These substances, as well as the soldering acid deposit on the seams, are removed by means of the cleaning solution, and the raw flour paste will then adhere more uniformly thereto. Under certain conditions it is desirable to apply a thin coating of wax, grease or oily material to the upper end of the can to prevent the paste from adhering thereto.

As shown in Fig. 1, we may apply the raw paste to the inside of the can be substantially filling the can 1 with a thin raw flour paste 2 or other suitable paste mixture. This step of the process may be accomplished in other ways, as for example by applying the paste by spraying or by means of a brush, the former being a very convenient method. The can is then inverted and excess paste poured out, leaving a thin layer that adheres to the zinc. The can is then immersed, while inverted, in a tank 4 containing water maintained at or somewhat near the boiling point by any suitable means such as steam pipes 5. Any suitable mechanical means will be used for holding the cans in the hot water in an inverted position. A pair of tongs 8 is shown by way of example, but obviously automatic equipment will be used in actual factory practice. The can will be held in the water a suitable time to permit the hot water on the outside to cook the paste on the inside to the desired degree. By the method described the hot water cooks the layer of paste on the zinc without coming in contact with it, and the resulting layer of paste is in a fairly dry condition.

As shown in Fig. 2, when the can is held in the water bath in an inverted position the immersing is done in such a manner that the air is trapped in the can, and the immersing allows the water to enter the can a short distance. Any paste around the top is washed off, as well as any paste which runs down the side after the can is inverted. If a layer of wax or grease is applied to the upper end of the can there is little tendency for the paste to adhere and the hot water in this case melts most of the paraffin or washes off the grease, so that under any of these circumstances a clean, unpasted upper end is secured. By this method a thin, uniform layer of thoroughly cooked paste in a fairly dry condition is secured on the sides and bottom, which is very desirable. If the can is cooked in an upright position the excess paste collects at the bottom in an undesirable manner, and if cooked in an inverted position without immersing in water, the excess paste collects around the edges forming a ridge which interferes with later operations.

After the coating is formed on the can in this way, the cartridge 5, may be immediately inserted without further drying of the paste layer, and additional raw or cooked paste is added between the cartridge and the cooked lining on the can. The cell may be finished by sealing in the usual way.

As shown in Figs. 2 and 3, the paste coating does not extend up to the top of the can. An uncoated upper end 6 provided in this manner is exceedingly desirable, as when the seal 7 is applied the upper end 6 is clean and the seal adheres to unpasted zinc much better than if the entire inside is coated. Our invention is not, however, necessarily limited to cooking the paste in such a manner that a clean upper edge is secured, as we may close the end of the can in various ways, which do not allow the paste at the top to be washed off. Our invention furthermore is not necessarily limited to hot water as a cooking agent, as other means may be used.

This process may be used not only for the small flashlight cells in which the depolarizing cartridge is used, but may also be used with the large or so-called No. 6 cells, using a cartridge wrapped in cheese cloth or a paper lined cell and tamped mix, or a formed cartridge without any lining or wrapping. In fact, our improved process may be used for coating dry cell zincs that may be finished into complete dry cells in any manner desired.

Having described our invention, what we claim is:

1. The process of forming paste coatings on dry cell zincs, which consists in applying a coating of vegetable paste to the zinc can, inverting the can so that the excess paste will not collect on the bottom, and applying heat to cook the flour paste while the cell is in this position.

2. The process of forming paste coatings on dry cell zincs, which consists in applying a coating of vegetable paste to the zinc can, inverting the can so that the excess paste will not collect on the bottom, closing the upper end of the can, and applying heat to cook the flour paste while the cell is in this position.

3. The process of forming paste coatings on dry cell cans, which consists in applying a coating of raw vegetable paste to a zinc can, inverting and immersing the can in hot water until the paste is cooked whereby the excess paste is drained into the water instead of onto the bottom of the can.

4. The process of applying a coating of paste to a dry cell container, which consists in filling the can with raw paste, pouring the paste out of the can to leave a thin layer of uncooked paste on the inside of the can, immersing the can in hot water while in an inverted position to trap the air contained therein and to allow the hot water to enter the can a short distance, and maintaining the can in the hot water until the paste is sufficiently cooked.

5. The process of applying a coating of paste to dry cell cans, which consists in spraying the inside of the can with raw paste, inverting the can so that the excess paste will not collect at the bottom and applying heat to cook the flour paste while the cell is in this position.

6. In dry cells, a zinc container electrode having a uniform coating of flour paste on the inside and bottom thereof extending only to within a short distance of the open end of the can and having an uncoated upper edge, said paste being cooked onto the surface of the zinc, and a seal in the upper end of the can adjoining the uncoated edge.

In testimony whereof, we hereunto affix our signatures.

RAYMOND C. BENNER.
HARRY F. FRENCH.